（12）United States Patent
Kimura

(10) Patent No.: US 11,156,150 B2
(45) Date of Patent: Oct. 26, 2021

(54) INLET DUCT FOR INTERNAL COMBUSTION ENGINE

(71) Applicant: TOYOTA BOSHOKU KABUSHIKI KAISHA, Aichi (JP)

(72) Inventor: Ryusuke Kimura, Ichinomiya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/915,521

(22) Filed: Jun. 29, 2020

(65) Prior Publication Data

US 2021/0003067 A1 Jan. 7, 2021

(30) Foreign Application Priority Data

Jul. 5, 2019 (JP) .............................. JP2019-126147

(51) Int. Cl.
*F02M 23/00* (2006.01)
*F02B 27/02* (2006.01)
*F02M 35/108* (2006.01)

(52) U.S. Cl.
CPC ....... *F02B 27/0215* (2013.01); *F02M 35/108* (2013.01)

(58) Field of Classification Search
USPC ....... 123/184.21, 184.24; 138/118, 137, 119, 138/121; 181/224
See application file for complete search history.

(56) References Cited

U.S. PATENT DOCUMENTS

| | | | | |
|---|---|---|---|---|
| 6,116,288 A | * | 9/2000 | Yamamura | ....... F02M 35/10091 138/118 |
| 6,553,953 B1 | * | 4/2003 | Fujihara | ............. F02M 35/1272 123/184.21 |
| 2004/0134171 A1 | * | 7/2004 | Scott | ..................... B01D 46/521 55/482 |
| 2007/0039659 A1 | * | 2/2007 | Coel | ...................... F16L 11/115 138/173 |
| 2007/0113912 A1 | * | 5/2007 | Lawrence | ................ F16L 11/10 138/121 |
| 2009/0293832 A1 | * | 12/2009 | Matsumoto | ........ F02M 35/1238 123/184.61 |
| 2014/0190764 A1 | * | 7/2014 | Matsumoto | ........ F02M 35/1255 181/226 |

FOREIGN PATENT DOCUMENTS

JP 11-343939 12/1999

* cited by examiner

*Primary Examiner* — George C Jin
*Assistant Examiner* — Teuta B Holbrook
(74) *Attorney, Agent, or Firm* — Greenblum & Bernstein, P.L.C.

(57) ABSTRACT

An inlet duct includes a tubular main body formed by a compression-molded fibrous molded body. The main body includes an alternate layout region in which an air-impermeable high-compression portion and an air-permeable low-compression portion hat is compression-molded at a lower compressibility than a compressibility of the high-compression portion are alternately laid out in an axial direction of the main body. The alternate layout region is configured such that an arbitrary pair of points at an equal distance in the axial direction to a central position in an upstream region and a downstream region of the alternate layout region include only points that are both located in the low-compression portions and points one of which is located in the low-compression portion and the other one of which is located in the high-compression portion.

5 Claims, 4 Drawing Sheets

Upstream Side ⟵⟶ Downstream Side

Upstream Side ← → Downstream Side

Upstream Side ← → Downstream Side

Upstream Side ⟵⟶ Downstream Side

INLET DUCT FOR INTERNAL COMBUSTION ENGINE

1. Field

The present disclosure relates to an inlet duct for an internal combustion engine.

2. Description of Related Art

Japanese Laid-Open Patent Publication No. 11-343939 discloses an inlet duct for an internal combustion engine that is formed by compression-molding a nonwoven fabric containing thermoplastic binders. The inlet duct described in this document includes hard portions with a high compressibility and soft portions with a low compressibility. Further, the hard portions and the soft portions are alternately arranged in the axial direction of the inlet duct. At least a part of the wall of the inlet duct described in this document is the soft portion, which has a certain degree of air permeability. Thus, the sound wave of intake air is converted into thermal energy by vibrating the fibers of the soft portions. This prevents the generation of standing waves of intake noise, thereby reducing intake noise. Additionally, the hard portions ensure the rigidity of the inlet duct.

Such an inlet duct for an internal combustion engine reduces the intake noise at a particular frequency. However, there is still room for improvement of the reduction of intake noise at a wide range of frequencies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an objective of the present disclosure to provide an inlet duct for an internal combustion engine capable of reducing intake noise at a wide range of frequencies.

An inlet duct for an internal combustion engine that solves the above-described objective includes a tubular main body formed by a compression-molded fibrous molded body. The main body includes an alternate layout region in which an air-impermeable high-compression portion and an air-permeable low-compression portion that is compression-molded at a lower compressibility than a compressibility of the high-compression portion are alternately laid out in an axial direction of the main body. The alternate layout region is divided into an upstream region and a downstream region of a central position in an axial direction of the inlet duct in a flow direction of intake air. The alternate layout region is configured such that an arbitrary pair of points at an equal distance in the axial direction to the central position in the upstream region and the downstream region include only points that are both located in the low-compression portions and points one of which is located in the low-compression portion and the other one of which is located in the high-compression portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the hall scope of the disclosure to one of ordinary skill in the art.

An inlet duct 10 for an internal combustion engine according to an embodiment will now be described with reference to FIGS. 1 to 6. In the following description, the upstream side and the downstream side in the flow direction of intake air in the inlet duct 10 are simply referred to as the upstream side and the downstream side, respectively.

Figure 1:
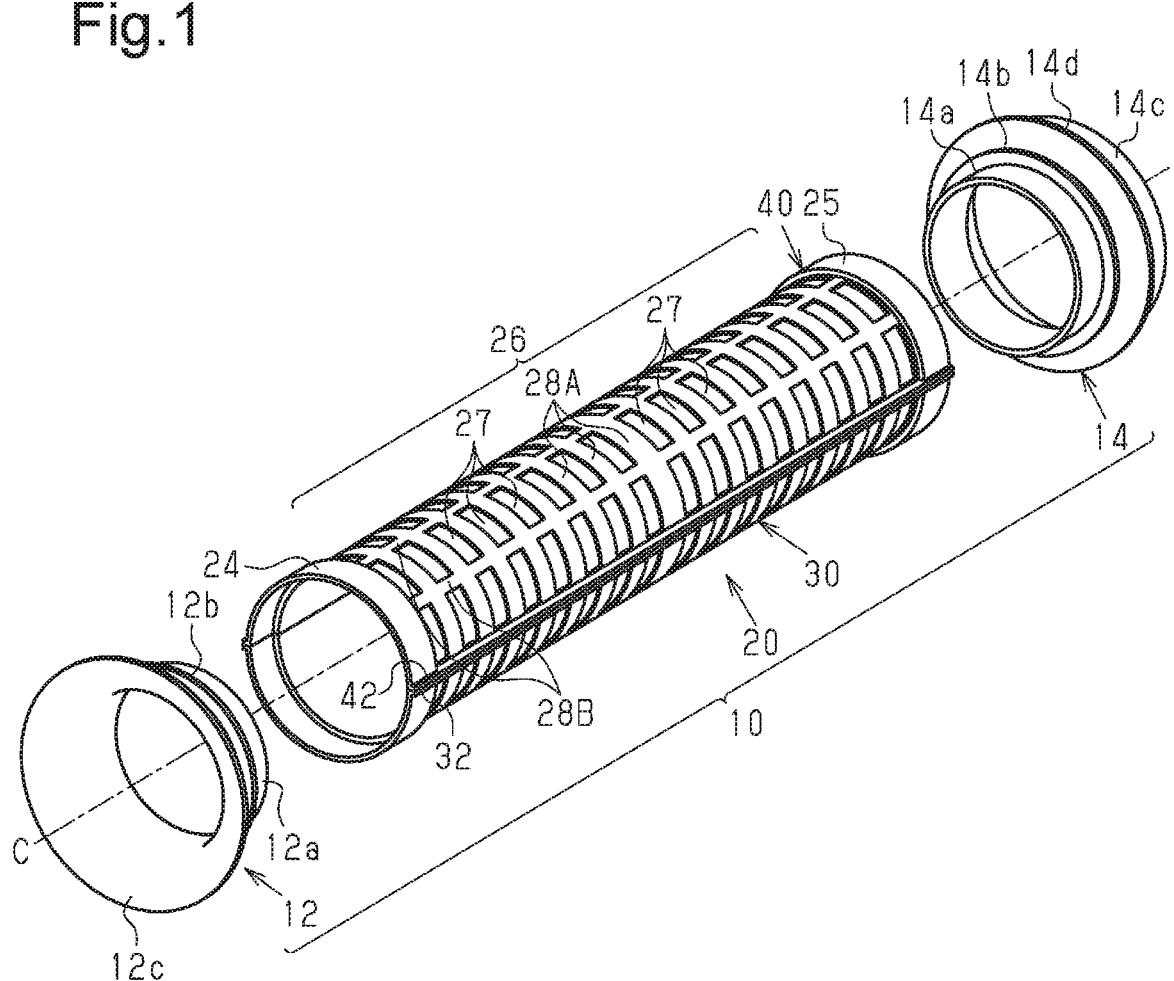
FIG. 1 is an exploded perspective view of an inlet duct for an internal combustion engine according to an embodiment, showing an upstream connection member, a main body, and a downstream connection member of the inlet duct that are separated from one another.
Figure 2:
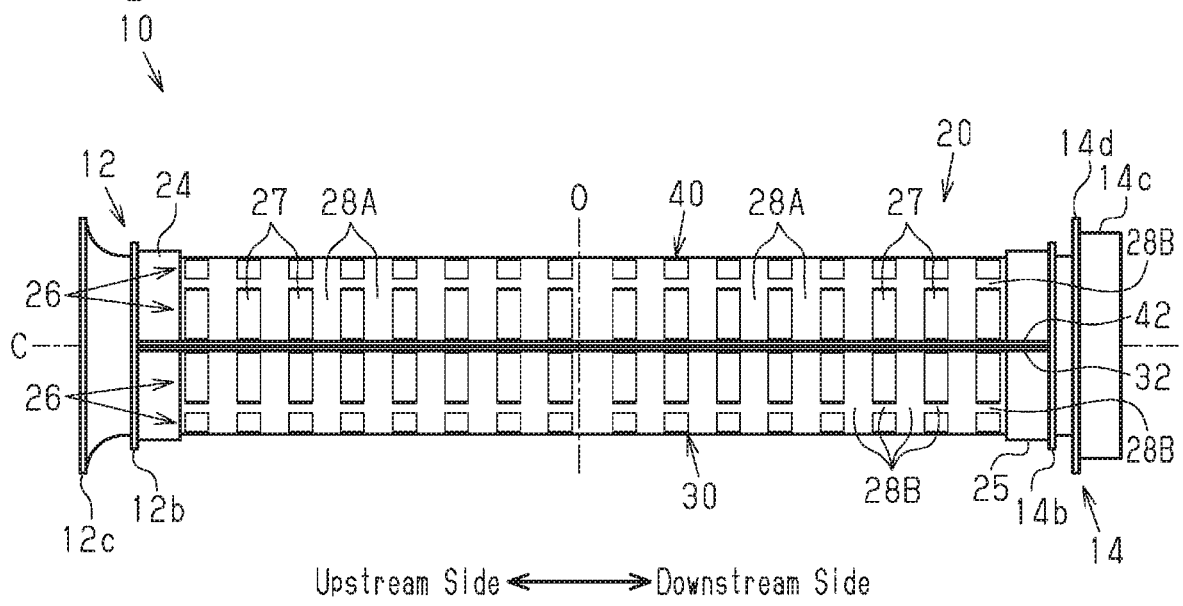
FIG. 2 is a side view showing the inlet duct in the embodiment.
Figure 4:
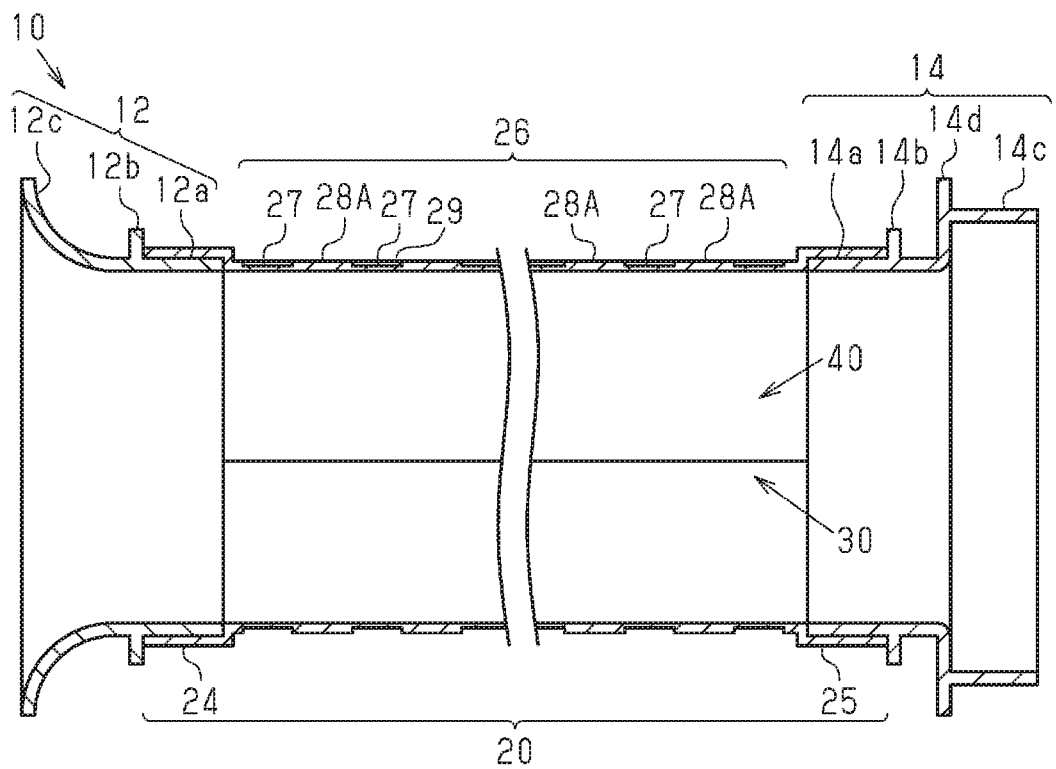
FIG. 4 is a cross-sectional view showing the inlet duct in the embodiment.

As shown in FIGS. 1, 2, and 4, the inlet duct 10 for the internal combustion engine includes a tubular main body 20, a tubular upstream connection member 12 on the upstream side of the main body 20, and a tubular downstream connection member 14 on the downstream side of the main body 20.

The upstream connection member 12 is the inlet of the inlet duct 10. The upstream connection member 12 includes a cylindrical connection portion 12a, an annular flange 12b, and a funnel portion 12c. The flange 12b projects from the outer circumferential surface of the connection portion 12a. The funnel portion 12c is continuous with the upstream part of the connection portion 12a and has a recurved shape such that it extends radially outward toward the upstream side.

The downstream connection member 14 is the outlet of the inlet duct 10. The downstream connection member 14 includes a cylindrical first connection portion 14a and an annular first flange 14b. The first flange 14b is arranged so as to project from the outer circumferential surface of the first connection portion 14a. Further, the downstream connection member 14 includes a cylindrical second connection portion 14c and annular second flange portion 14d. The second connection portion 14c is continuous with the downstream side of the first connection portion 14a and has a larger diameter than the first connection portion 14a. The second flange portion 14d projects from the outer circumferential surface of the second connection portion 14c. The first connection portion 14a and the second connection portion 14c are arranged on the same axis C. A step is formed over the entire circumference between the first connection portion 14a and the second connection portion 14c. The downstream end of the downstream connection member 14 is connected to the inlet (not shown) of an air cleaner.

The main body 20 is formed by joining a first halved body 30 and a second halved body 40, each of which has a half cylinder shape, to each other. The first halved body 30 and the second halved body 40 are formed by a compression-molded fibrous molded body.

The opposite ends of the halved bodies 30 and 40 in the circumferential direction are provided with two joints 32 and 42, respectively. The joints 32 and 42 project outward in the radial direction and extend entirely in the direction corresponding to the axis C (hereinafter referred to as the axial direction). The joint 32 of the first halved body 30 and the joint 42 of the second halved body 40 are joined to each other to form the main body 20.

The main body 20 includes ends 24 and 25 at the opposite sides in the axial direction. The ends 24 and 25 have a larger diameter than the other portions of the main body 20.

As shown in FIG. 4, the connection portion 12a of the upstream connection member 12 is inserted into the end 24 of the main body 20, which is on the upstream side, and the end 24 abuts against the flange 12b. In this state, the outer surface of the connection portion 12a and the inner surface of the end 24 are joined to each other using adhesive.

The first connection portion 14a of the downstream connection member 14 is inserted into the end 25 of the main body 20, which is on the downstream side, and the end 25 abuts against the first flange 14b. In this state, the outer surface of the first connection portion 14a and the inner surface of the end 25 are joined to each other using adhesive.

As shown in FIGS. 1 to 4, the main body 20 includes alternate layout regions 26 located between the ends 24 and 25. In each alternate layout region 26, air-impermeable high-compression portions 27 and air-permeable first low-compression portions 28A are alternately laid out in the axial direction. The first low-compression portions 28A are thermally compression-molded at a lower compressibility than that of the high-compression portions 27.

The high-compression portions 27 have a rectangular shape in a side view with long sides and short sides that respectively extend in the circumferential direction and the axial direction of the main body 20.

The multiple alternate layout regions 26 are spaced apart from one another by a predetermined distance in the circumferential direction of the main body 20.

A second low-compression portion 28B extends between adjacent ones of the alternate layout regions 26 in the circumferential direction. The second low-compression portions 28B are arranged entirely in the axial direction between the ends 24 and 25 of the main body 20. The second low-compression portions 28B are thermally compression-molded at a lower compressibility than that of the high-compression portions 27 and have air permeability. In the present embodiment, the second low-compression portions 28B are thermally compression-molded at the same compressibility as that of the first low-compression portions 28A.

Figure 3:
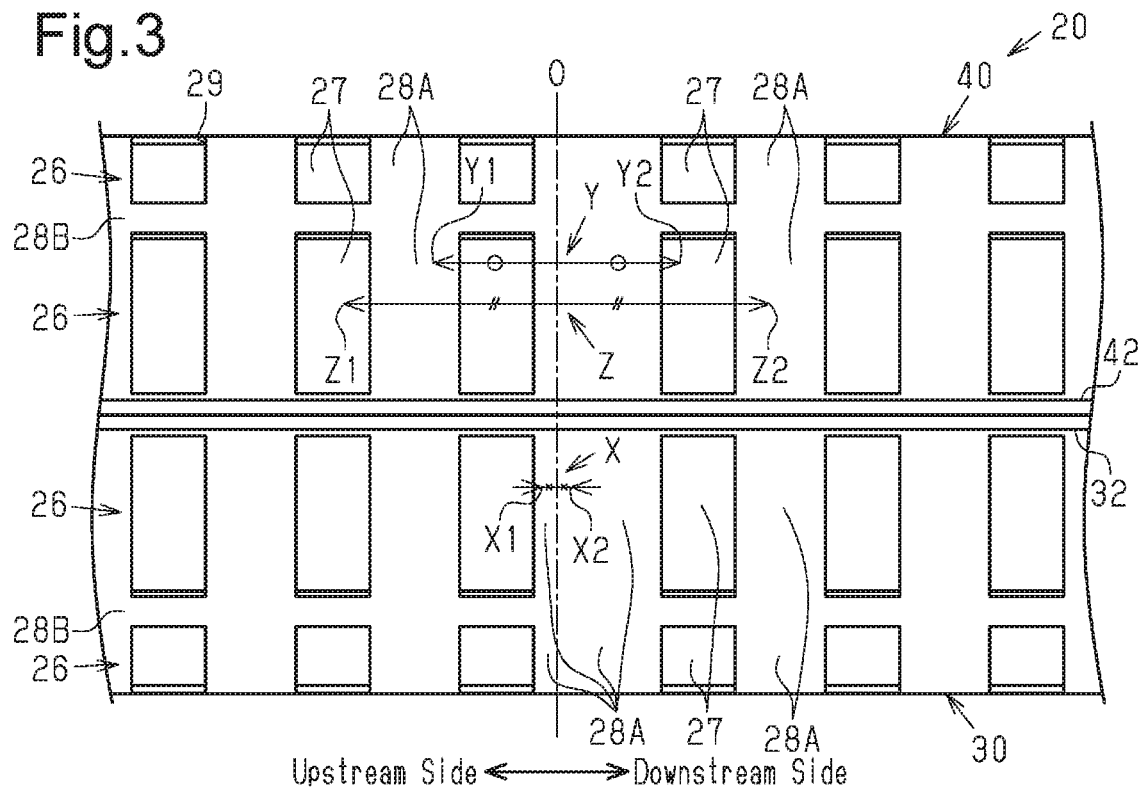
FIG. 3 is an enlarged side view mainly showing the alternate layout regions in the embodiment.

As shown in FIGS. 2 and 3, the alternate layout regions 26 are divided into the upstream region and the downstream region of the central position O in the axial direction of the inlet duct 10. The alternate layout region 26 is configured such that an arbitrary pair of points at an equal distance in the axial direction to the central position O in the upstream region and the downstream region include only points that are both located in the first low-compression portions 28A and points one of which is located in the first low-compression portion 28A and the other one of which is located in the high-compression portion 27.

As exemplified in FIG. 3, a pair of points X include an upstream point X1 and a downstream point X2, which are both located in the first low-compression portions 28A. Further, a pair of points Y include an upstream point Y1, which is located in the first low-compression portion 28A, and a downstream point Y2, which is located in the high-compression portion 27. Furthermore, a pair of points Z include an upstream point Z1, which is located in the high-compression portion 27, and a downstream point Z2, which is located in the first low-compression portion 28A.

More specifically, the alternate layout regions 26 do not include an arbitrary pair of points at an equal distance in the axial direction to the central position O in the upstream region and the downstream region that are both located in the high-compression portions 27.

In the present embodiment, the central position O is the center from the upstream end of the upstream connection member 12 to the end (second flange 14d) of the downstream connection member 14 connected to the inlet of the air cleaner (refer to FIG. 4). This is because the standing wave of intake noise is generated in the region from the upstream end of the inlet duct 10 to the connection end, which is immediately before the inner diameter of the inlet duct 10 is increased on the downstream side.

As shown in FIGS. 3 and 4, the high-compression portions 27 and the first low-compression portions 28A are continuous with each other with steps 29 located in between on the outer surface of the main body 20, and the high-compression portions 27 and the first low-compression portions 28A are evenly continuous with each other on the inner surface of the main body 20.

The fibrous molded body of the halved bodies 30 and 40 will now be described.

The fibrous molded body is made of, for example, nonwoven fabric of a polyethylene terephthalate (PET) fiber and nonwoven fabric of known core-sheath composite fibers each including a core (not shown) made of PET and a sheath (not shown) made of denatured PET having a lower melting point than the PET fiber. The denatured PET, which serves as the sheath of the composite fibers, functions as a binder that binds the fibers to each other.

The mixture percentage of the denatured PET is preferably between 30 to 70%. In the present embodiment, the mixture percentage of denatured PET is 50%.

Such a composite fiber may also include polypropylene (PP) having a lower melting point than PET.

The mass per unit area of the fibrous molded body is preferably 500 to 1500 g/m$^2$. In the present embodiment, the mass per unit area of the fibrous molded body is 800 g/m$^2$.

The halved bodies 30 and 40 are each formed by thermally compressing (thermally pressing) the above-described nonwoven sheet having a predetermined thickness (for example, 30 to 100 mm).

The air permeability of the high-compression portion 27 is set to approximately 0 cm$^3$/cm$^2$·s. In the present specification, the air permeability is measured using A-Method (Frazier Method), which is defined in Japanese Industrial Standards (JIS) L1096. Further, the thickness of the high-compression portion 27 is preferably 0.5 to 1.5 mm. In the present embodiment, the thickness of the high-compression portion 27 is set to 0.7 mm. In the present embodiment, the ends 24 and 25 of the main body 20 and the joints 32 and 42 of the halved bodies 30 and 40 are thermally compression-molded at the same compressibility as the high-compression portion 27.

The air permeability of the first low-compression portion 28A and the second low-compression portion 28B is set to 3 cm$^3$/cm$^2$·s. Further, the thickness of the low-compression portions 28A and 28B is preferably 0.8 to 3.0 mm. In the present embodiment, the thickness of the low-compression portions 28A and 28B is set to 1.0 mm.

The operation of the present embodiment will now be described.

Figure 5A:
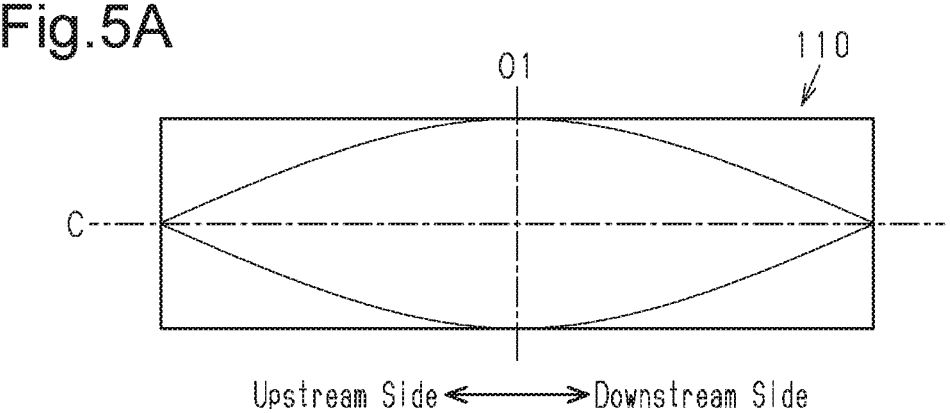
FIGS. 5A to 5C are side views schematically showing an inlet duct according to a comparative example and a standing wave at a particular frequency that is generated in the inlet duct.
Figure 5B:
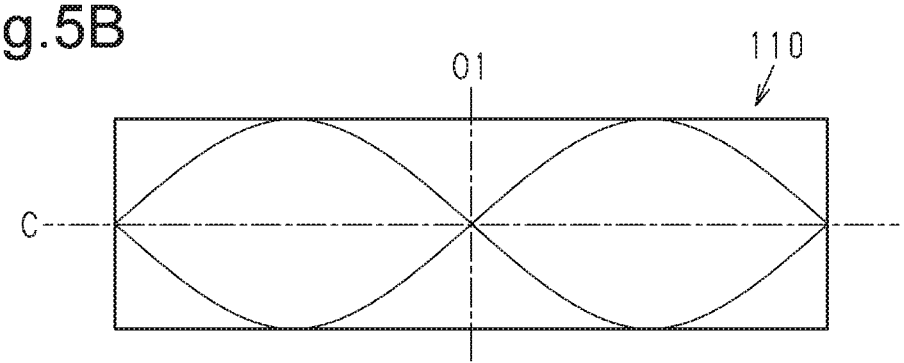
Figure 5C:
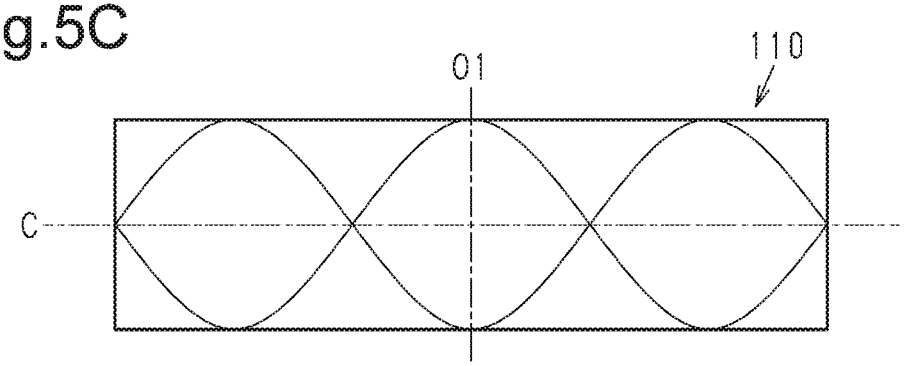

As shown in FIGS. 5A to 5C, the standing wave of intake noise is generated in an inlet duct 110. The anti-nodes of the standing wave are symmetrically located in the axial direction with respect to the central position O1 of the axial direction of the inlet duct 110. Further, the standing wave of intake noise at various frequencies is generated in the inlet duct 110. The distance in the axial direction from the central position O1 to the anti-nodes of the standing wave differs depending on the frequency of the standing wave. Generally, the sound wave of intake air vibrates the fibers of the low-compression portions and is thus converted into thermal energy. This prevents the generation of the standing wave of intake noise. The frequency of the standing wave of intake air that can be prevented from being generated by the low-compression portions differs depending on the distance in the axial direction from the central position O1 to the low-compression portions. Thus, if a pair of high-compression portions 27 are arranged at an equal distance from the central position O1 to the upstream side and the downstream side in the flow direction of intake air, it is difficult for the high-compression portions 27 to prevent the generation of the standing wave at a particular frequency corresponding to the distance.

In the present embodiment, in the alternate layout regions 26 on the main body 20, arbitrary pairs of points X, Y, and Z, each pair located at an equal distance from the central position O, do not include points that are located in the high-compression portions 27. That is, in each of the arbitrary pairs of points X, Y and Z, at least one of the points is located in the first low-compression portion 28A. This allows the first low-compression portion 28A to prevent the generation of the standing wave at a particular frequency that may be generated at the points X, Y and Z. Accordingly, the entire alternate layout region 26 in the axial direction is utilized to prevent the generation of the standing wave of intake noise.

Figure 6:
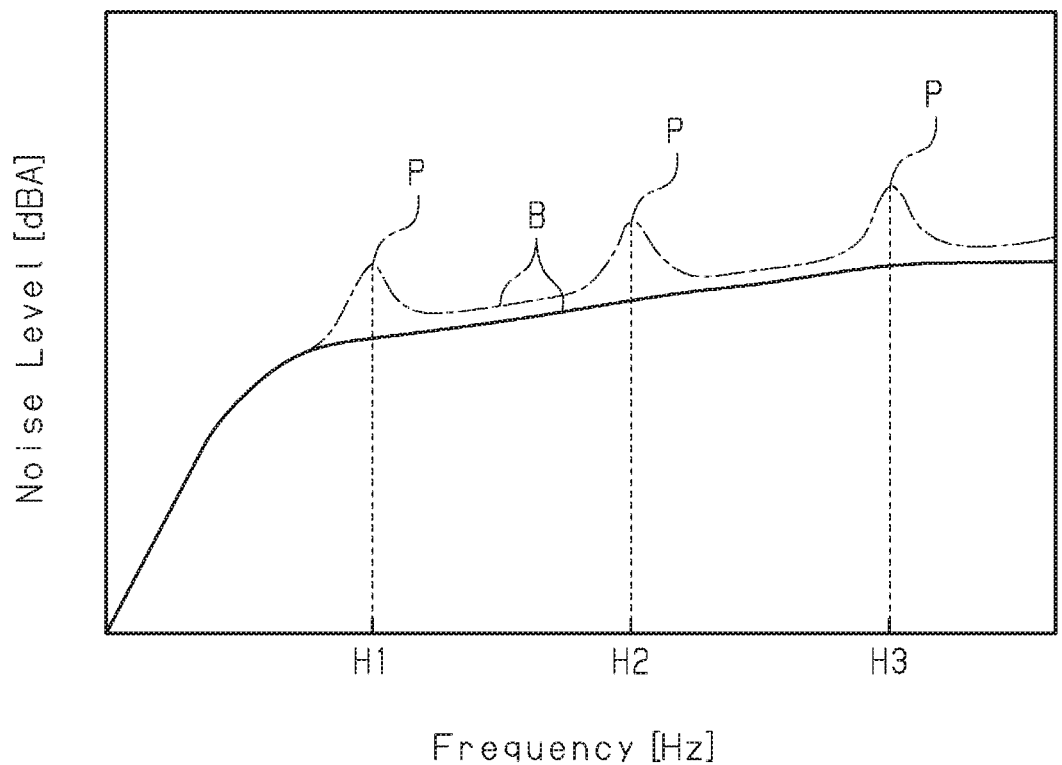
FIG. 6 is a graph showing the relationship between the frequency and noise level of intake noise in the inlet duct of the embodiment.

With reference to FIG. 6, comparison will be made for the noise level of intake noise between the inlet duct 10 in the present embodiment and an inlet duct in a comparative example made of a hard plastic. The noise level of intake noise is detected using a microphone arranged in the proximity of the inlet of the inlet duct 10.

As shown by the alternate long and short dashed line in FIG. 6, the noise level in the inlet duct of the comparative example has high base values B and has high peak values P resulting from the resonance in the intake pipe at resonant frequencies H1, H2, and H3.

As shown by the solid line in FIG. 6, since the inlet duct 10 of the present embodiment achieves the above-described operation, the base values B of noise level in the inlet duct 10 are reduced over a wide range of frequencies as compared with the inlet duct of the comparative example. Further, the sound wave of intake air vibrates the fibers of the first low-compression portions 28A and the second low-compression portions 28B and is thus converted into thermal energy. This prevents the resonance in the intake pipe and thus reduces the peak values P that result from the resonance in the intake pipe.

The advantages of the present embodiment will now be described, (1) The inlet duct 10 includes the tubular main body 20, which is formed by a compression-molded fibrous molded body. The main body 20 includes the alternate layout regions 26, in each alternate layout region 26, the air-impermeable high-compression portions 27 and the air-permeable first low-compression portions 28A, which are compression-molded at a lower compressibility than that of the high-compression portions 27, are alternately laid out in the axial direction. An arbitrary pair of points at an equal distance in the axial direction to the central position O in the upstream region and the downstream region of the alternate layout region 26 include only points that are both located in the first low-compression portions 284 and points one of which is located in the first low-compression portion 28A and the other one of which is located in the high-compression portion 27.

Such a structure achieves the above-described operation and thus reduces intake noise at a wide variety of frequencies.

(2) A part of the main body 20 in the circumferential direction is provided with the air-permeable second low-compression portions 28B, which are extended in the axial direction and compression-molded at a lower compressibility than that of the high-compression portions 27. The alternate layout regions 26 are adjacent to the second low-compression portions 28B in the circumferential direction of the main body 20.

In such a structure, the second low-compression portions 28B are located at the positions corresponding to the anti-nodes of the standing wave at various frequencies that may be generated in the inlet duct 10. Thus, in addition to the reduction effect of intake noise achieved by the alternate layout regions 26. the intake noise at a wide variety of frequencies is further reduced by the second low-compression portions 28B.

Modifications

The above-illustrated embodiment may be modified as follows. The present embodiment and the following modifications can be combined as long as the combined modifications remain technically consistent with each other.

In the inlet duct, the upstream connection member 12 and the downstream connection member 14 may be formed integrally with the main body 20 using a fibrous molded body.

Figure 7:
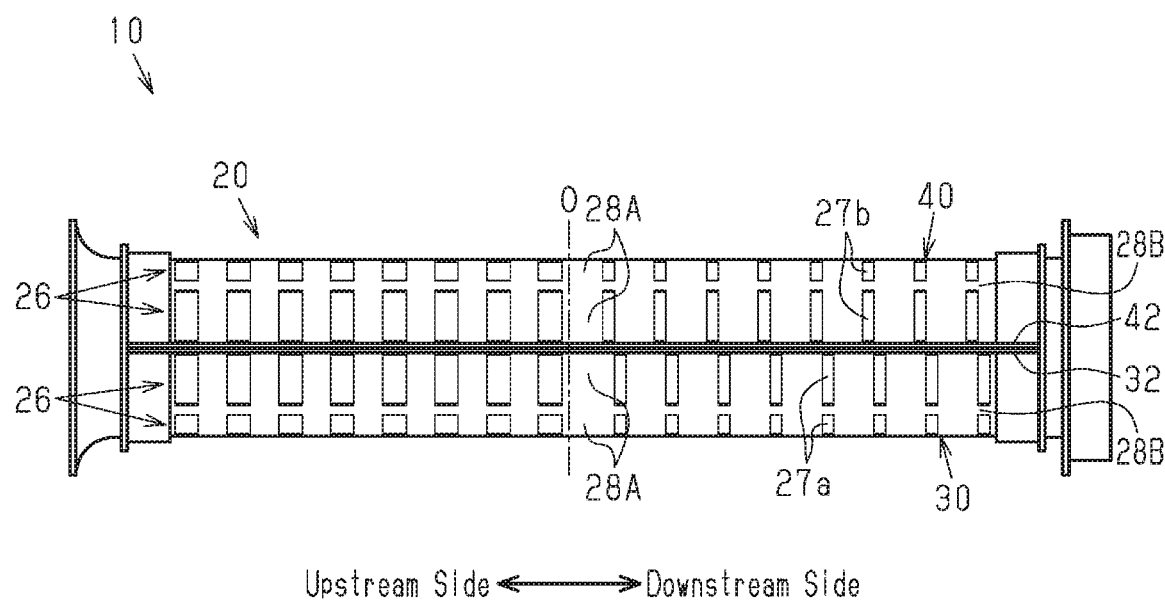
FIG. 7 is a side view of an inlet duct according to a modification.

As shown in FIG. 7, for example, high-compression portions 27*a* and high-compression portions 27*b* may be arranged differently in the first halved body 30 and the second halved body 40 on the downstream side of the central position O. Such change may be applied to the upstream side of the central position O.

The second low-compression portions 28B may be omitted.

Various changes in form and details may be made to the examples above without departing from the spirit and scope of the claims and their equivalents. The examples are for the sake of description only, and not for purposes of limitation. Descriptions of features in each example are to be considered as being. applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An inlet duct for an internal combustion engine, the inlet duct comprising a tubular main body formed by a compression-molded fibrous molded body, wherein
   the main body includes an alternate layout region in which an air-impermeable high-compression portion and an air-permeable low-compression portion that is compression-molded at a lower compressibility than a compressibility of the high-compression portion are alternately laid out in an axial direction of the main body,
   the alternate layout region is divided into an upstream region and a downstream region of a central position in an axial direction of the inlet duct in a flow direction of intake air, and
   the alternate layout region is configured such that an arbitrary pair of points at an equal distance in the axial direction to the central position in the upstream region and the downstream region include only points that are both located in the low-compression portions and points one of which is located in the low-compression portion and the other one of which is located in the high-compression portion.

2. The inlet duct according to claim 1, wherein
   the low-compression portion is a first low-compression portion,
   a part of the main body in a circumferential direction is provided with an air-permeable second low-compression portion that is extended in the axial direction and compression-molded at a lower compressibility than the compressibility of the high-compression portion, and
   the alternate layout region is adjacent to the second low-compression portion in the circumferential direction of the main body.

3. The inlet duct according to claim 2, wherein
   the alternate layout region is one of a plurality of alternate layout regions,
   the alternate layout regions are spaced apart from one another by a predetermined distance in the circumferential direction of the main body, and
   the second low-compression portion is arranged between adjacent ones of the alternate layout regions in the circumferential direction.

4. The inlet duct according to claim 1, wherein
   the alternate layout region is one of a plurality of alternate layout regions, and
   the alternate layout regions are spaced apart from one another by a predetermined distance in a circumferential direction of the main body.

5. The inlet duct according to claim 1, wherein
   the main body includes a first halved body and a second halved body that have a half cylinder shape, and
   the high-compression portions are arranged differently in the first halved body and the second halved body on a downstream side or an upstream side of the central position.

* * * * *